US006418669B1

(12) United States Patent
Suter

(10) Patent No.: US 6,418,669 B1
(45) Date of Patent: Jul. 16, 2002

(54) DOORJAMB REINFORCEMENT PLATES

(76) Inventor: Paul J. Suter, 77 Bell View Cir., McKees Rocks, PA (US) 15136

( * ) Notice: Subject to any disclaimer, the term of this patent is extended or adjusted under 35 U.S.C. 154(b) by 0 days.

(21) Appl. No.: 09/565,658

(22) Filed: May 5, 2000

Related U.S. Application Data

(60) Provisional application No. 60/132,526, filed on May 5, 1999.

(51) Int. Cl.[7] .................................................. B60J 5/00
(52) U.S. Cl. ............................ 49/462; 292/346; 49/460
(58) Field of Search .......................... 49/460, 461, 462, 49/501; 292/343, 346; 52/211, 514

(56) References Cited

U.S. PATENT DOCUMENTS

| | | | | | |
|---|---|---|---|---|---|
| 3,279,840 | A | * | 10/1966 | Barone | |
| 3,918,207 | A | * | 11/1975 | Aliotta | 49/462 |
| 3,934,910 | A | | 1/1976 | Radke | |
| 4,058,332 | A | | 11/1977 | DiFazio | |
| 4,770,452 | A | | 9/1988 | Petree, Jr. | |
| 4,802,701 | A | * | 2/1989 | Mazie | 292/340 |
| 5,003,727 | A | * | 4/1991 | Watten | 49/504 |
| 5,024,475 | A | * | 6/1991 | Francis | 292/340 |
| 5,031,946 | A | * | 7/1991 | Yarrow | 292/337 |
| 5,127,690 | A | * | 7/1992 | Kim et al. | 292/340 |
| 5,154,461 | A | | 10/1992 | Prescott et al. | |
| 5,171,050 | A | * | 12/1992 | Mascotte | 292/341.18 |
| 5,241,790 | A | * | 9/1993 | Schimpf | 49/504 |
| 5,566,509 | A | | 10/1996 | Long | |
| 5,586,796 | A | * | 12/1996 | Fraser | 292/346 |
| 5,678,871 | A | * | 10/1997 | Zarzycki, Jr. | 292/346 |
| 5,752,728 | A | * | 5/1998 | Matouschek | 292/340 |
| 5,836,628 | A | * | 11/1998 | Beier | 292/346 |
| 5,934,024 | A | * | 8/1999 | Simpson | 49/462 |
| 6,082,049 | A | * | 7/2000 | Hudson | 49/460 |

* cited by examiner

*Primary Examiner*—Curtis A. Cohen
(74) *Attorney, Agent, or Firm*—Cohen & Grigsby, P.C.

(57) ABSTRACT

A structure for reinforcing doorjambs wherein first and second reinforcement plates (32 and 42) are located between the doorjamb (16) and the structure frame (34). Reinforcement plates (32 and 42) are arranged in overlapping fashion and are provided with respective bolt holes (26 and 48) that are in registry with a bolt hole (26) of the doorjamb (16). The overlapped reinforcement plate structure provides increased strength and greater flexibility for ease of installation.

14 Claims, 2 Drawing Sheets

DOORJAMB REINFORCEMENT PLATES

This application claim benefit of Ser. No. 60/132,526 May 5, 1999.

BACKGROUND OF THE INVENTION

1 Field of the Invention

The presently disclosed invention is related to improvements in the security of vertically hinged doors and, more particularly, to improvements to wood doorjambs that are used in combination with vertically hinged steel doors.

2 Description of the Prior Art The prior art includes many devices that are intended to strengthen entry doors against forced entry. Some of these devices such as shown in U.S. Pat. Nos. 4,058,332 and 3,934,910 were directed to strengthening the area around the door locking mechanism.

With particular regard to steel doors, it has been found that the door is actually stronger and more rigid than the supporting doorjamb. Thus, a point of forced entry has often become the doorjamb and not the door. Accordingly, prior art devices such as shown in U.S. Pat. Nos. 3,918,207 and 5,154,461 include various structures for strengthening the doorjamb.

An accepted method of preventing forced entry is the use of dead bolt locks. Prior art structures have also addressed strengthening the doorjamb when the door employs a dead bolt lock. However, some prior art structures as shown in U.S. Pat. No. 5,566,509 attempted to strengthen the area immediately around the strike plate and the deadbolt lock, but not the larger area of the doorjamb in general. Such devices also led to other difficulties such as interference and high wear of weather-stripping. In addition, they were frequently aesthetically unacceptable. In some cases, the visibility of the device allowed it to be more easily defeated by one who is attempting to gain unauthorized access.

Still other devices that are described in the prior art provide structure that strengthens the door against forced entry, and that are also not visible or that are substantially hidden by the conventional frame and jamb structures. However, in some cases, the design of these devices did not allow their inclusion in existing structures. Examples are seen in U.S. Pat. Nos. 5,024,475 and 5,581,948.

Still other devices such as shown in U.S. Pat. Nos. 4,770,452; 5,934,024 and 5,836,628 provided support to the doorjamb for the purpose of strengthening the structural elements, but were sized such that additional support was desirable, were difficult to install in the space typically afforded in existing structures, or required detailed finish carpentry .

Accordingly, a need has persisted in the prior art for a structure that will strengthen the doorjamb in the area of the deadbolt in a manner that is aesthetically acceptable and that can be easily installed in both new and existing structures. In particular, there was a need for such doorjamb supports that would afford still greater strength and greater support of the doorjamb than structures known in the prior art.

SUMMARY OF THE INVENTION

In accordance with the presently disclosed invention, a doorway structure is designed for use with a door of the type that employs a deadbolt lock. The structure includes a doorjamb with a bolt hole that passes between a finished inner surface and a rough outer surface. The doorway structure further includes a door stop that is secured to the finished surface of the doorjamb at a location that brings the deadbolt of the door lock into registry with the bolt hole of the doorjamb so that the bolt hole of the doorjamb will receive the deadbolt of the door at times when the door is in the closed position. First and second reinforcement plates are located between the rough surface of the doorjamb and the structure frame with a portion of the first reinforcement plate overlapping a portion of the second reinforcement plate. Each of the first and second reinforcement plates have respective bolt holes that are in the overlapping portion of the first and second reinforcement plates with the bolt holes both being in registry with the bolt hole of the doorjamb so that the bolt holes of the first and second reinforcing plates receive the deadbolt of the door lock.

Preferably, the vertical extent of the first reinforcing plate is at least one-half the vertical length of the doorjamb and the vertical extent of the second reinforcing plate is also at least one-half the vertical extent of the doorjamb.

Also preferably, the width of the first and second reinforcing plates is substantially equal to the width of the doorjamb. Most preferably, the first and second reinforcing plates are secured to the doorjamb by fastening means such as an adhesive or mechanical fasteners, used either alone or in combination.

Other details, objects and advantages of the subject invention will become apparent to those skilled in the art as a presently preferred embodiment of the subject invention proceeds.

BRIEF DESCRIPTION OF THE DRAWINGS

A presently preferred embodiment of the disclosed invention is shown and described in connection with the accompanying drawings in which.

DESCRIPTION OF A PRESENTLY PREFERRED EMBODIMENT OF THE INVENTION

Figure 1:
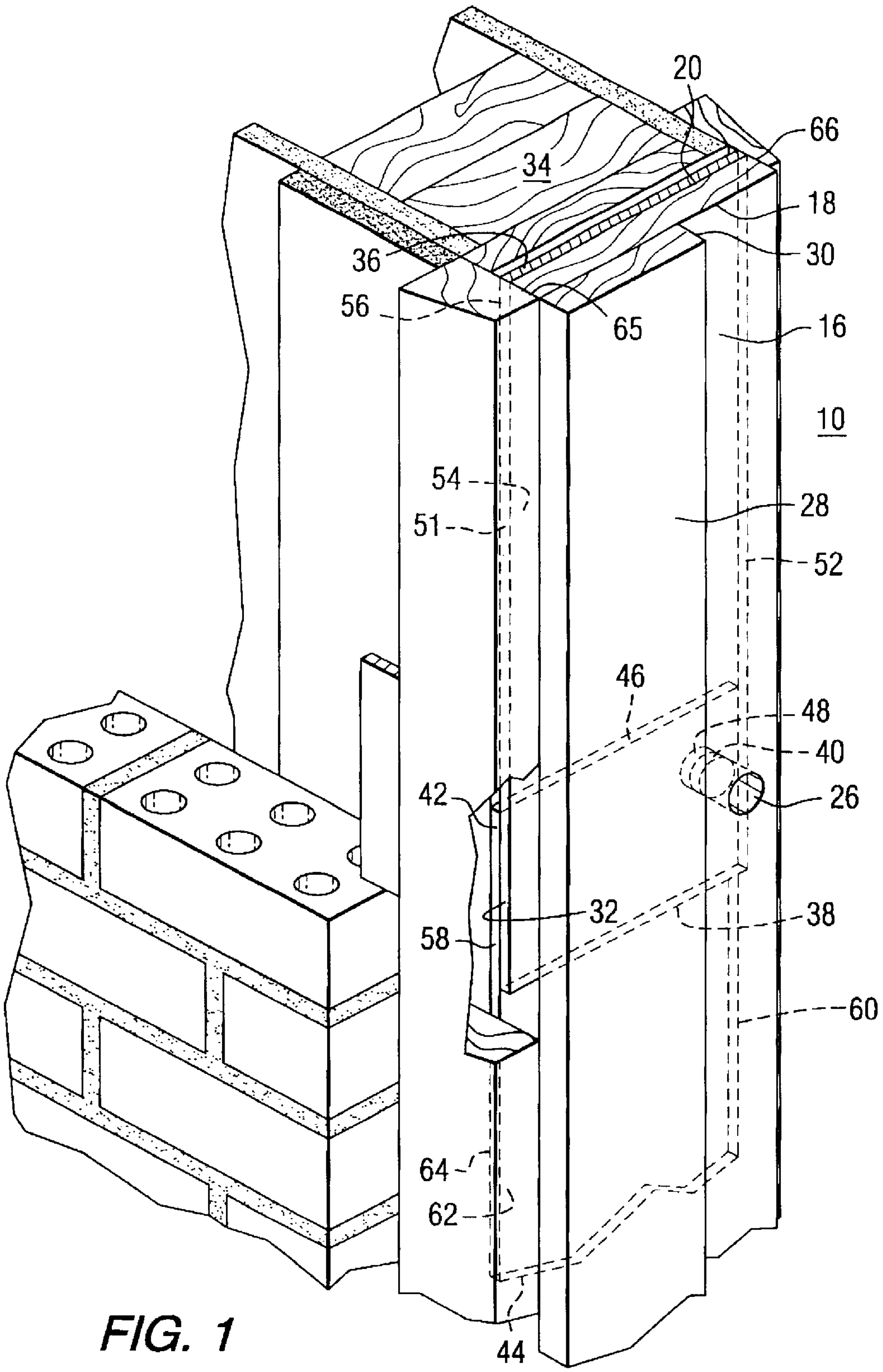
FIG. 1 is a perspective view of the presently disclosed doorway structure with portions thereof shown in section to better disclose the present invention.
Figure 2:
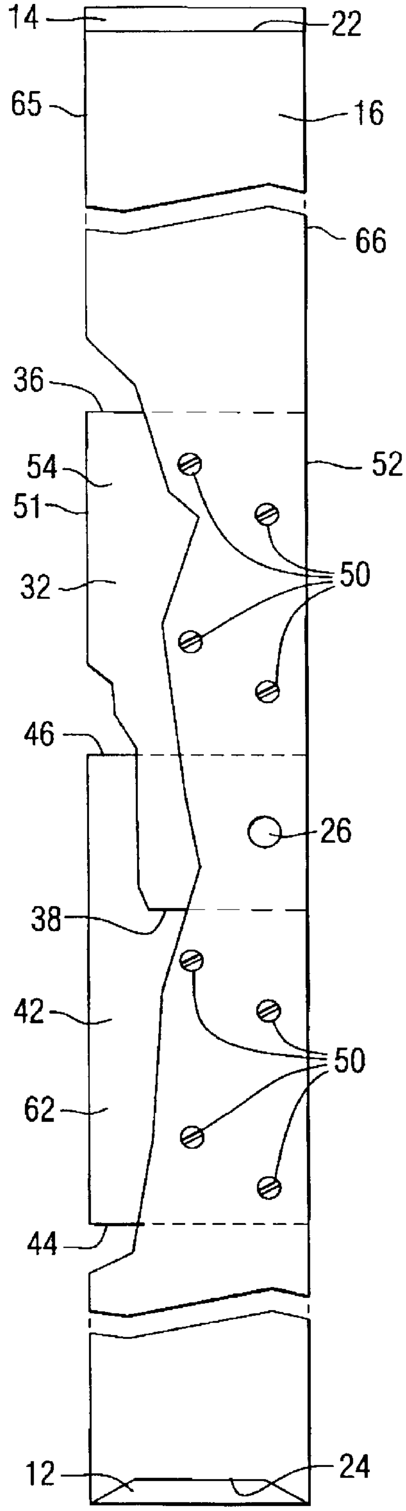
FIG. 2 is a view of the doorjamb of FIG. 1 taken along the lines 2—2 of FIG. 1 with portions thereof broken away to better disclose the first and second reinforcement plates that are included in the structure.

As shown in FIGS. 1 and 2, a doorway structure (10) cooperates with a door (not shown). The door is of the type that is supported on at least one vertical hinge such that it is pivotally moveable between a closed position and an open position. In addition, the door includes a deadbolt lock that engages the doorway to prevent unauthorized entry.

The doorway structure includes a threshold (12) and a header (14) that are connected to a doorjamb (16). The doorjamb (16) has a finished surface (18) and a rough surface (20) that is oppositely disposed on the doorjamb (16) from the finished surface (18). The doorjamb (16) includes a top end (22) and a bottom end (24). The top end (22) of doorjamb (16) is connected to the header (14) and the bottom end (24) of doorjamb (16) is connected to the threshold (12).

Doorjamb (16) also includes a deadbolt bolt hole (26) that passes between the finished surface (18) and the rough surface (20). The bolt hole (26) is located at a lateral position on finished surface (18) and rough surface (20) such that bolt hole (26) selectively receives the deadbolt of the door at times when the door is in a closed position.

The doorway structure further includes a door stop (28) that is secured to the finished surface (18) of the doorjamb (16). Door stop (28) defines a stop surface (30) that is oriented substantially orthogonally with respect to the finished surface (18) of the doorjamb (16). The door stop (28) is located on doorjamb (16) at a lateral position with respect the bolt hole (26) such that the deadbolt in the door is in registry with the bolt hole of the doorjamb (16) at times when the face of the door is located opposite to the stop surface (30) of the door stop (28).

A first reinforcement plate (32) is located between the rough surface (20) of the doorjamb (16) and the structure frame (34). Reinforcement plate (32) includes a top end (36) that is vertically positioned between the top end (22) of doorjamb (16) and the bolt hole (26) of doorjamb (16). Reinforcement plate (32) also includes a bottom end (38) that is vertically positioned between the bottom end (24) of doorjamb (16) and bolt hole (26) of doorjamb (16). Reinforcement plate (32) includes a bolt hole (40) that is laterally located in the body of the reinforcement plate (32) such that it is in registry with the bolt hole (26) of doorjamb (16).

The preferred embodiment further includes a second reinforcement plate (42) that is located between the rough surface (20) of the doorjamb (16) and the structure frame (34). Reinforcement plate (42) includes a bottom end (44) that is vertically positioned between the bottom end (24) of doorjamb (16) and the bolt hole (26) of doorjamb (16). Reinforcement plate (42) also includes a top end (46) that is vertically positioned between the top end (22) of doorjamb (16) and bolt hole (26) of doorjamb (16).

Reinforcement plate (42) includes a bolt hole (48) that is laterally located in the body of the reinforcement plate (42) such that it is in registry with the bolt hole (26) of doorjamb (16) and with the bolt hole (40) of reinforcement plate (32). In this way, the bolt holes (40 and 48) cooperate with the bolt hole (26) of doorjamb (16) to receive the bolt of the door lock at times when the bolt extends through bolt hole (26) of the doorjamb (16).

The vertical location of the top (46) of reinforcement plate (42) is higher than the bottom (38) of reinforcement plate (32) such that reinforcement plates (32 and 42) overlap with at least a portion of the first planar side of reinforcement plate (32) opposing at least a portion of the second planar side of reinforcement plate (42).

The reinforcement plates (32 and 42) are made of material that is substantially stronger than the material of doorjamb (16) which in the preferred embodiment is wood although doorjamb (16) could also be made of other materials. In the preferred embodiment, reinforcement plates (32 and 42) are made of steel, although other materials are also within the scope of the disclosed invention. This provides the structure herein disclosed with improved strength for the reason that force that is applied in a normal direction against the face of the door and transferred to the deadbolt lock will be applied against the area of reinforcement plates (32 and 42) that incorporate bore holes (40 and 48). In that way, the force is distributed from reinforcement plates (32 and 42) to the vertical length of the doorjamb (16) which is secured to the combination of the overlapping reinforcement plates (32 and 42).

Due to the strength of the steel material of reinforcement plates (32 and 42), the reinforcement plates (32 and 42) can be relatively thin and still distribute the force over the vertical length of the doorjamb. Preferably, the thickness of reinforcement plates (32 and 42) is approximately 20 to 30 gauge steel. Thinner gauges tend to wrinkle at the time of installation while it has been found that thicker gauges are generally unnecessary.

The vertical spacing between the top end (36) of the first reinforcement plate (32) and the bottom end (38) of the first reinforcement plate is approximately the same as one-half the vertical spacing between the top end (22) and the bottom end (24) of doorjamb (16). Alternatively, the vertical spacing between the top end (36) and the bottom end (38) of the first reinforcement plate (32) also can be greater than one-half the vertical spacing between the top end (22) and the bottom end (24) of the doorjamb (16).

The vertical spacing between the top end (46) of the second reinforcement plate (42) and the bottom end (44) of the second reinforcement plate is approximately the same as one-half the vertical spacing between the top end (22) and the bottom end (24) of doorjamb (16). Alternatively, the vertical spacing between the top end (46) and the bottom end (44) of the second reinforcement plate (42) also can be greater than one-half the vertical spacing between the top end (22) and the bottom end (24) of the doorjamb (16).

The reinforcement plates (32 and 42) are secured to the doorjamb (16) by an adhesive material, mechanical fasteners, or the combination thereof. Fastening means such as adhesive or fasteners or a combination thereof are used to secure the reinforcing plates (32 and 42) against the rough surface (20) of doorjamb (16). In the presently preferred embodiment, fasteners, such as self tapping screws (50) with metal cutting tips are driven through from the finished surface (18) of doorjamb (16). Self tapping screws (50) engage reinforcing plates (32 and 42) and draw reinforcing plates (32 and 42) against the rough surface (20) of doorjamb (16) and firmly secure the reinforcement plates (32 and 42) to doorjamb (16). It is most preferred that reinforcement plate (32) is thus secured first to doorjamb (16) and then reinforcement plate (42) is also secured to the doorjamb (16) and to reinforcement plate (32).

The force that is applied against the door and transferred to the dead bolt also will be applied according to the width of the reinforcement plates (32 and 42). In the preferred embodiment, reinforcement plate (32) includes lateral sides (51) and (52) that are defined between planar sides (54) and (56). Similarly, reinforcement plate (42) includes lateral sides (58) and (60) that are located between planar sides (62) and (64). In the preferred embodiment, lateral sides (51 and 52) and lateral sides (58 and 60) are separated by a spacing that is substantially equivalent to the lateral spacing between the sides (65) and (66) of doorjamb (16). In this way, the area over which the force against the reinforcement plates (32 and 42) is distributed to the doorjamb (16) is optimized. Alternatively, it is also within the scope of the disclosed invention, to make sides (51 and 52) and ((58 and 60) of reinforcement plates (32 and 42) narrower than the spacing between sides (65 and 66) of doorjamb (16).

Figure 3:
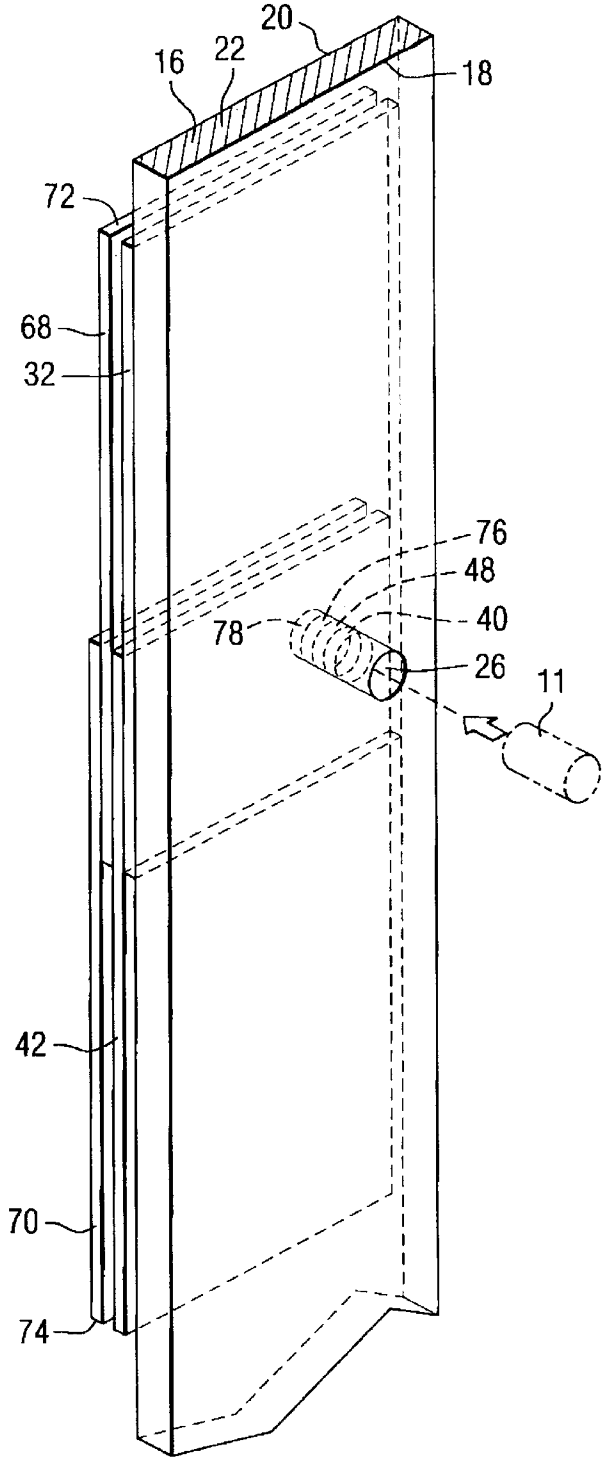
FIG. 3 is a partial perspective view of an alternative embodiment of the doorway structure that is shown in FIG. 1.

FIG. 3 shows an alternative embodiment of the presently disclosed invention wherein a third reinforcement plate (68) and a fourth reinforcement plate (70) have also been added to the first and second reinforcement plates (32 and 42). As shown in FIG. 3, the vertical location of the top (72) of third reinforcement plate (68) is higher than the vertical location of the bottom (74) of fourth reinforcement plate (70). In this way, third and fourth reinforcement plates (68 and 70) are located in respectively overlapping arrangement between first and second reinforcement plates (32 and 42) and the structure frame (34). At least a portion of the first planar side of reinforcement plate (68) opposes at least a portion of the second planar side of reinforcement plate (70).

Third and fourth reinforcement plates (68 and 70) are also provided with respective bolt holes (76 and 78) that are in registry with each other and with the deadbolt bolt holes (40 and 48) of first and second reinforcement plates (32 and 42). In this way, the bolt holes (76 and 78) cooperate with the bolt holes (40 and 48) and with the bolt hole (26) of doorjamb (16) to receive the bolt of the door lock at times when the bolt extends through bolt hole (26) of the doorjamb (16).

Third and fourth reinforcement plates (68 and 70) combine with first and second reinforcement plates (32 and 42) to provide a stronger resistance to forced entry of the doorway at the point of the doorjamb. One advantage of the embodiment shown in FIG. 3 is that it allows the use of thinner gauge reinforcement plates while affording the same or even greater strength in the assembled components. The thinner gage material is more flexible and therefor is sometimes easier to install in the gap between the doorjamb (16) and the structure frame (34) for certain applications.

While a presently preferred embodiment of the subject invention has been described herein, the subject invention is not limited thereto but can also be variously embodied within the scope of the following claims.

What is claimed is:

1. A doorway structure including a threshold and a header and further comprising:

a doorjamb that defines a finished surface and that also defines a rough surface, said rough surface being oppositely disposed from said finished surface, said doorjamb having a bolt hole between the finished surface and the rough surface;

a door stop that is secured to the finished surface of said doorjamb, said door stop defining a stop surface that is oriented substantially orthogonally with respect to the finished surface of the doorjamb, said door stop being located laterally with respect to said bolt hole in said doorjamb;

a first reinforcement plate having first and second planar sides, said first reinforcement plate also having first and second lateral sides that are located between the first and second planar sides of said first reinforcement plate, said first reinforcement plate being located between the rough surface of the doorjamb and the structure, said first reinforcement plate having a bolt hole that is in registry with the bolt hole of the doorjamb, said first reinforcement plate also having a top end that is vertically positioned between the top end of the doorjamb and the doorjamb bolt hole, said first reinforcement plate also having a bottom end that is vertically positioned between the bottom end of the doorjamb and the bolt hole of the doorjamb; and a second reinforcement plate having first and second planar sides, said second reinforcement plate also having first and second lateral sides that are located between the first and second planar sides of said second reinforcement plate, said second reinforcement plate being located between the rough surface of the doorjamb and the structure with at least a portion of the first planar side of the first reinforcement plate opposing at least a portion of the second planar side of the second reinforcement plate, said second reinforcement plate having a bottom end that is vertically positioned between the bottom end of the doorjamb and the doorjamb bolt hole, said second reinforcement plate also having a top end that is vertically positioned between the top end of the doorjamb and the bolt hole of the doorjamb, said second reinforcement plate also having a bolt hole that is in registry with the bolt hole of the first reinforcement plate and with the bolt hole of the doorjamb.

2. The doorway structure of claim 1 wherein the top end of the second reinforcing plate overlaps the bottom end of the first reinforcing plate.

3. The doorway structure of claim 2 wherein the first reinforcing plate defines first and second planar sides and wherein the second reinforcing plate defines first and second planar sides and wherein at least a portion of the first planar side of the first reinforcing plate opposes at least a portion of the second planar side of the second reinforcing plate.

4. The doorway structure of claim 2 wherein the doorjamb is comprised of wood material.

5. The doorway structure of claim 1 wherein the vertical spacing between the top and bottom of the first reinforcement plate is substantially equal to one-half the vertical spacing between the top and bottom of the doorjamb.

6. The doorway structure of claim 1 wherein the vertical spacing between the top and bottom of the second reinforcing plate is substantially equal to one-half the vertical spacing between the top of the doorjamb and the bottom of the doorjamb.

7. The doorway structure of claim 1 wherein the first and second reinforcing plates have respective inner planar sides and outer planar sides, with the inner planer side of the each of the first and second reinforcing plates being oppositely disposed from the outer planar side of the respective reinforcing plate, and wherein the bolt hole in each of the first and second reinforcing plates extends between the first and second planar sides, the width of the first and second planar sides of the first reinforcing plate being substantially equal to the width of the rough side of the doorjamb.

8. The doorway structure of claim 1 wherein the first reinforcing plate has a first planar side and a second planar side that is oppositely disposed from the first planar side, and wherein the hole in the first reinforcing. plate extends between the first and second planar sides, the width of the first and second planar sides of the first reinforcing plate being substantially less than the width of the rough side of the doorjamb.

9. The doorway structure of claim 1 and further comprising:

a third reinforcement plate that is located laterally adjacent to the second reinforcement plate; and a fourth reinforcement plate that is located between the third reinforcement plate and the structure.

10. The doorway structure of claim 1 wherein said first and second reinforcement plates are secured to the doorjamb with fastening means.

11. The doorway structure of claim 1 wherein said fastening means comprises at least one mechanical fastener in combination with an adhesive.

12. The doorway structure of claim 1 wherein said fastening means comprises at least one mechanical fastener.

13. The doorway structure of claim 1 wherein said fastening means comprises an adhesive material.

14. The doorway structure of claim 1 wherein the bottom end of the first reinforcing plate overlaps the top end of the second reinforcing plate.

* * * * *